(12) United States Patent
Ding et al.

(10) Patent No.: US 12,118,689 B1
(45) Date of Patent: Oct. 15, 2024

(54) THREE-DIMENSIONAL IMAGE, ELECTRONIC DEVICE AND STORAGE MEDIUM

(71) Applicants: Capital Normal University, Beijing (CN); China University of Mining and Technology, Beijing (CN)

(72) Inventors: Hui Ding, Beijing (CN); Guoping Huo, Beijing (CN); Jiacheng Lu, Beijing (CN); Yuhan Huang, Beijing (CN)

(73) Assignees: Capital Normal University, Beijing (CN); China University of Mining and Technology, Beijing, Beijing (CN)

( * ) Notice: Subject to any disclaimer, the term of this patent is extended or adjusted under 35 U.S.C. 154(b) by 0 days.

(21) Appl. No.: 18/733,482

(22) Filed: Jun. 4, 2024

(30) Foreign Application Priority Data

Nov. 20, 2023 (CN) .......................... 202311541133.5

(51) Int. Cl.
*G06K 9/00* (2022.01)
*G06T 19/20* (2011.01)
*G06V 10/774* (2022.01)

(52) U.S. Cl.
CPC .......... *G06T 19/20* (2013.01); *G06T 2200/04* (2013.01); *G06T 2219/2016* (2013.01); *G06V 10/774* (2022.01)

(58) Field of Classification Search
CPC .......... G06T 2207/20084; G06T 2207/10081; G06T 2207/30004; G06T 2207/20081;
(Continued)

(56) References Cited

U.S. PATENT DOCUMENTS 9,968,257 B1* 5/2018 Burt .................... A61B 5/0035
2020/0074701 A1* 3/2020 Liang .................... G16H 30/40

FOREIGN PATENT DOCUMENTS

CN 112927163 6/2021
CN 113822923 A 12/2021
(Continued)

OTHER PUBLICATIONS

Kashou NH, Smith MA, Roberts CJ. Ameliorating slice gaps in multislice magnetic resonance images: an interpolation scheme. Int J Comput Assist Radiol Surg. Jan. 2015; 10(1):19-33. doi: 10.1007/s11548-014-1002-3. Epub Apr. 23, 2014. PMID: 24756885. (Year: 2015).*
First Office Action issued in CN202311541133.5 on Dec. 29, 2023, and English Translation thereof.
(Continued)

*Primary Examiner* — Alex Kok S Liew
(74) *Attorney, Agent, or Firm* — ARC IP Law, PC; Joseph J. Mayo (57) ABSTRACT

A method and an apparatus for augmenting data of a three-dimensional image, an electronic device and a storage medium are provided. The method includes acquiring at least one three-dimensional sample image to be augmented; rotating, for each three-dimensional sample image, the three-dimensional sample image according to a predetermined rotation angle to obtain an initial sample image of a radial slice of the three-dimensional sample image on a transverse section, an initial sample image of the radial slice of the three-dimensional sample image on a median sagittal section and an initial sample image of the radial slice of the three-dimensional sample image on a coronal section; performing interpolation processing on a plurality of initial sample images to obtain a plurality of augmented sample images; and adding the plurality of augmented sample (Continued)

images into corresponding datasets to obtain an augmented three-dimensional sample image set.

13 Claims, 4 Drawing Sheets

(58) Field of Classification Search
CPC .............. G06T 7/0012; G06T 7/11; G06T 2207/10088; G06T 2207/30016; G06T 7/70; G06T 19/006; G06T 2200/04; G06T 2207/30012; G06T 2207/30061; G06T 2207/30208; G06T 2210/41; G06T 2219/004; G06T 5/50; G06T 5/70; G06T 7/0014; G06T 7/10; G06T 7/20; G06T 19/20; G06T 2207/20216; G06T 2207/30101; G06T 2207/30241; G06T 3/60; G06T 5/60; G06T 7/12; G06T 7/174; G06T 7/62; G06T 11/008; G06T 2207/30048; G06T 2207/30104; G06T 2207/30172; G06T 2211/404; G06T 2219/028; G06T 2219/2004; G06T 19/003; G06T 2200/08; G06T 2207/10024; G06T 2207/20076; G06T 2207/30244; G06T 2210/21; G06T 2219/2012; G06T 2219/2016; G06T 7/73; G06T 7/90; G06T 9/00

See application file for complete search history.

(56) References Cited

FOREIGN PATENT DOCUMENTS

| CN | 11393594 | 1/2022 |
| CN | 113935943 | 1/2022 |
| CN | 114820535 | 7/2022 |
| WO | 2022161357 | 8/2022 |
| WO | 2023066364 | 4/2024 |

OTHER PUBLICATIONS

Notification to Grant Patent Right for Invention issued in CN202311541133.5 on Jan. 17, 2024, and English Translation thereof.

* cited by examiner

THREE-DIMENSIONAL IMAGE, ELECTRONIC DEVICE AND STORAGE MEDIUM

CROSS-REFERENCE TO RELATED APPLICATION

This patent application claims the benefit and priority of Chinese Patent Application No. 202311541133.5 filed with the China National Intellectual Property Administration on Nov. 20, 2023, the disclosure of which is incorporated by reference herein in its entirety as part of the present application.

BACKGROUND OF THE INVENTION

Technical Field of the Invention

At least one embodiment relates to the technical field of image processing, in particular to a method and an apparatus for augmenting data of a three-dimensional image, an electronic device, and a storage medium.

Description of the Related Art

With the continuous development of artificial intelligence technology, image processing technology based on deep learning has become more mature and has become more and more widely used. In the process of deep learning technology, a large number of image data need to be trained. A learning model trained by the Artificial Intelligence (AI) technology driven by a dataset requires a huge and diverse training dataset to ensure robustness and interoperability. However, due to the limitation of time and cost, there may be often situations in which the number of images is small, the image quality is poor and the categories are unbalanced. Therefore, data augmentation has become a promising and cost-effective technology to increase the size and diversity of training datasets. Through the technology of increasing data, the effect of enriching the dataset itself, improving the performance of a corresponding classification detection system, and expanding the extended value can be achieved.

In the related art, three-dimensional image data augmentation is generally based on processing the data to obtain two-dimensional image data and then augment the two-dimensional image data, or process the image data in 2.5 dimensions. The above processing methods may lead to the loss of three-dimensional characteristics of the data, which in turn results in the reduced authenticity of the augmented three-dimensional image data.

BRIEF SUMMARY OF THE INVENTION

In view of this, the purpose of at least one embodiment of the invention is to provide a method and an apparatus for augmenting data of a three-dimensional image, an electronic device and a storage medium. The three-dimensional sample image is directly processed to obtain an initial sample image of the radial slice of the three-dimensional sample image on different sections. After interpolation processing is performed on the initial sample images, a plurality of augmented sample images are obtained. The plurality of augmented sample images are added to the corresponding datasets, and the three-dimensional characteristics of the image data are preserved as much as possible. The augmented sample images are derived from the initial three-dimensional images, which can increase the size and diversity of the three-dimensional sample image dataset.

In a first aspect, an embodiment of the invention provides a method for augmenting data of a three-dimensional image, where the method for augmenting data includes:
acquiring at least one three-dimensional sample image to be augmented;
rotating, for each three-dimensional sample image, the three-dimensional sample image according to a predetermined rotation angle to obtain an initial sample image of a radial slice of the three-dimensional sample image on a transverse section, an initial sample image of the radial slice of the three-dimensional sample image on a median sagittal section and an initial sample image of the radial slice of the three-dimensional sample image on a coronal section;
performing interpolation processing on a plurality of initial sample images to obtain a plurality of augmented sample images; and
adding the plurality of augmented sample images into corresponding datasets based on the division of image datasets to obtain an augmented three-dimensional sample image set.

In one possible implementation, the rotating, for each three-dimensional sample image, the three-dimensional sample image according to a predetermined rotation angle to obtain an initial sample image of a radial slice of the three-dimensional sample image on a transverse section includes:
for each three-dimensional sample image, establishing a three-dimensional Cartesian coordinate system based on the three-dimensional sample image;
for each three-dimensional sample image, determining a first dimension the of three-dimensional sample image in a longitudinal axis direction, and determining a first rotation angle based on the first dimension;
for each three-dimensional sample image, with a vertical axis in the three-dimensional Cartesian coordinate system as a rotation axis, rotating the three-dimensional sample image according to the first rotation angle to obtain a plurality of first rotating radial slice images;
for each three-dimensional sample image, collecting longitudinal axial sectional images in each of the first rotating radial slice images to obtain the initial sample image of the radial slice of the three-dimensional sample image on the transverse section.

In one possible implementation, for each three-dimensional sample image, an initial sample image of the radial slice of the three-dimensional sample image on a median sagittal section is obtained by following steps:
for each three-dimensional sample image, determining a second dimension of the three-dimensional sample image in a horizontal axis direction, and determining a second rotation angle based on the second dimension;
for each three-dimensional sample image, with the vertical axis in the three-dimensional Cartesian coordinate system as the rotation axis, rotating the three-dimensional sample image according to the second rotation angle to obtain a plurality of second rotating radial slice images; and
for each three-dimensional sample image, collecting horizontal axial sectional images in each of the second rotating radial slice images to obtain the initial sample image of the radial slice of the three-dimensional sample image on the median sagittal section.

In one possible implementation, for each three-dimensional sample image, an initial sample image of the radial slice of the three-dimensional sample image on a coronal section is obtained by following steps:

for each three-dimensional sample image, determining a third dimension of the three-dimensional sample image in a vertical axis direction, and determining a third rotation angle based on the third dimension;

for each three-dimensional sample image, with a horizontal axis or the vertical axis in the three-dimensional Cartesian coordinate system as the rotation axis, rotating the three-dimensional sample image according to the third rotation angle to obtain a plurality of third rotating radial slice images; and for each three-dimensional sample image, collecting horizontal axial sectional images in each of the third rotating radial slice images to obtain the initial sample image of the radial slice of the three-dimensional sample image on the coronal section.

In one possible implementation, the three-dimensional sample image includes a three-dimensional original sample image and a three-dimensional truth sample image; where the three-dimensional truth sample image is constructed based on a corresponding relationship between a labeled two-dimensional truth image and a slice image;

in a case that the three-dimensional sample image corresponding to the initial sample image is the three-dimensional original sample image, for each initial sample image, a plurality of augmented sample images are obtained by following steps:

for each initial sample image, the pixel values of the missing pixel points in the initial sample image are calculated based on the pixel values of each pixel in that initial sample image; and for each initial sample image, filling the initial sample image according to the pixel value of the missing pixel point to obtain the augmented sample image corresponding to the initial sample image.

In one possible implementation, in a case that the three-dimensional sample image corresponding to the initial sample image is the three-dimensional truth sample image, for each initial sample image, a plurality of augmented sample images are obtained by following steps:

determining at least one label value corresponding to the three-dimensional truth sample image; for each initial sample image, calculating the pixel value of the missing pixel point in the initial sample image based on the pixel value of each pixel in the initial sample image;

for each initial sample image, performing similarity clustering on the pixel value in the initial sample image which is not equal to any label value in the three-dimensional truth sample image according to a similar pixel value area in the corresponding three-dimensional original sample image, so as to obtain a corrected pixel value; and for each initial sample image, filling the initial sample image according to the pixel value of the missing pixel point or the corrected pixel value to obtain the augmented sample image corresponding to the initial sample image.

In one possible implementation, the adding the plurality of augmented sample images into corresponding datasets based on the division of image datasets to obtain an augmented three-dimensional sample image set includes:

for each augmented sample image, determining whether the three-dimensional sample image corresponding to the augmented sample image belongs to a sample image in a training set or a sample image in a test set;

in response to a determination that the three-dimensional sample image corresponding to the augmented sample image belongs to the sample image in the training set, adding the augmented sample image to the training set;

in response to a determination that the three-dimensional sample image corresponding to the augmented sample image belongs to the sample image in the test set, in a case that a rotation angle corresponding to the augmented sample is greater than a predetermined rotation angle threshold, adding the augmented sample image to the training set.

In a second aspect, the embodiment of the invention further provides an apparatus for augmenting data of a three-dimensional image, where the apparatus for augmenting data includes: an image acquiring module, configured to acquire at least one three-dimensional sample image to be augmented;

an image rotating module, configured to rotate, for each three-dimensional sample image, the three-dimensional sample image according to a predetermined rotation angle to obtain an initial sample image of a radial slice of the three-dimensional sample image on a transverse section, an initial sample image of the radial slice of the three-dimensional sample image on a median sagittal section and an initial sample image of the radial slice of the three-dimensional sample image on a coronal section;

an image interpolation processing module, configured to perform interpolation processing on a plurality of initial sample images to obtain a plurality of augmented sample images; and a dataset dividing module, configured to add the plurality of augmented sample images into corresponding datasets based on the division of image datasets to obtain an augmented three-dimensional sample image set.

In a third aspect, the embodiment of the invention further provides an electronic device, including: a processor, a storage medium and a bus, where the storage medium stores machine-readable instructions executable by the processor, the processor communicates with the storage medium through the bus when the electronic device operates, and the processor executes the machine-readable instructions to execute the steps of the method for augmenting data of the three-dimensional image according to the first aspect.

In a fourth aspect, the embodiment of the invention further provides a non-transitory computer-readable storage medium, where a computer program is stored in the computer-readable storage medium, and the computer program, when operated by a processor, executes the steps of the method for augmenting data of the three-dimensional image according to the first aspect.

The embodiment of the invention provides a method and an apparatus for augmenting data of a three-dimensional image, an electronic device and a storage medium. The method includes: acquiring at least one three-dimensional sample image to be augmented; rotating, for each three-dimensional sample image, the three-dimensional sample image according to a predetermined rotation angle to obtain an initial sample image of a radial slice of the three-dimensional sample image on a transverse section, an initial sample image of the radial slice of the three-dimensional sample image on a median sagittal section and an initial sample image of the radial slice of the three-dimensional sample image on a coronal section; performing interpolation processing on a plurality of initial sample images to obtain a plurality of augmented sample images; and adding the plurality of augmented sample images into corresponding datasets based on division of image datasets to obtain an augmented three-dimensional sample image set. In this way, the three-dimensional sample image is directly processed to obtain an initial sample image of the radial slice of the three-dimensional sample image on different sections. After interpolation processing is performed on the initial sample imaged, a plurality of augmented sample images are obtained. The plurality of augmented sample images are added to the corresponding datasets, and the three-dimensional characteristics of the image data are preserved as much as possible. The augmented sample image is derived from an initial three-dimensional image, which can improve the authenticity of the augmented three-dimensional sample image.

In order to make the above objects, features and advantages of the invention more obvious and understandable, a detailed description is given to preferred embodiments, together with the attached drawings.

BRIEF DESCRIPTION OF THE DRAWINGS

In order to explain the technical scheme of the embodiments of the invention more clearly, the accompanying drawings needed to be used in the embodiments will be briefly introduced hereinafter. It should be understood that the following drawings only show some embodiments of the invention, so that the accompanying drawings should not be regarded as limiting the scope. For those skilled in the art, other related drawings can be obtained according to these drawings without creative work.

DETAILED DESCRIPTION OF THE INVENTION

In order to make the objects, technical schemes and advantages of the embodiment of the present disclosure more clear, the technical scheme in the embodiment of the present disclosure will be described clearly and completely in conjunction with the attached drawings. Apparently, the described embodiments are only some of the embodiments of the present disclosure, rather than all of the embodiments. The components of the embodiments of the present disclosure, which are generally described and illustrated in the accompanying drawings herein, can be arranged and designed in various different configurations. Therefore, the following detailed description of the embodiments of the present disclosure provided in the accompanying drawings is not intended to limit the scope of the present disclosure claimed, but merely represents selected embodiments of the present disclosure. Based on the embodiment of the present disclosure, every other embodiment obtained by those skilled in the art without creative work belongs to the scope of protection of the one or more embodiments of the invention.

First, the applicable application scenarios of the one or more embodiments of the invention are introduced. The application can be applied to the technical field of image processing.

With the continuous development of artificial intelligence technology, image processing technology based on deep learning has become more mature and has become more and more widely used. In the process of deep learning technology, a large number of image data need to be trained. A learning model trained by the Artificial Intelligence (AI) technology driven by a dataset requires a huge and diverse training dataset to ensure robustness and interoperability. However, due to the limitation of time and cost, there may be often situations in which the number of images is small, the image quality is poor and the categories are unbalanced. Therefore, data augmentation has become a promising and cost-effective technology to increase the size and diversity of training datasets. Through the technology of increasing data, the effect of enriching the dataset itself, improving the performance of a corresponding classification detection system, and expanding the extended value can be achieved.

In the related art, image data augmentation of three-dimensional images is generally based on data processing to obtain two-dimensional image data and enhance the two-dimensional image data, or processing the image data in 2.5 dimensions. The above processing method may lead to the loss of three-dimensional characteristics of the data when augmenting the image, which in turn leads to the low authenticity of the augmented image obtained after augmenting data.

Based on this, the at least one embodiment of the invention provides a method for augmenting data of a three-dimensional image to improve the authenticity of the augmented three-dimensional sample images.

Figure 1:
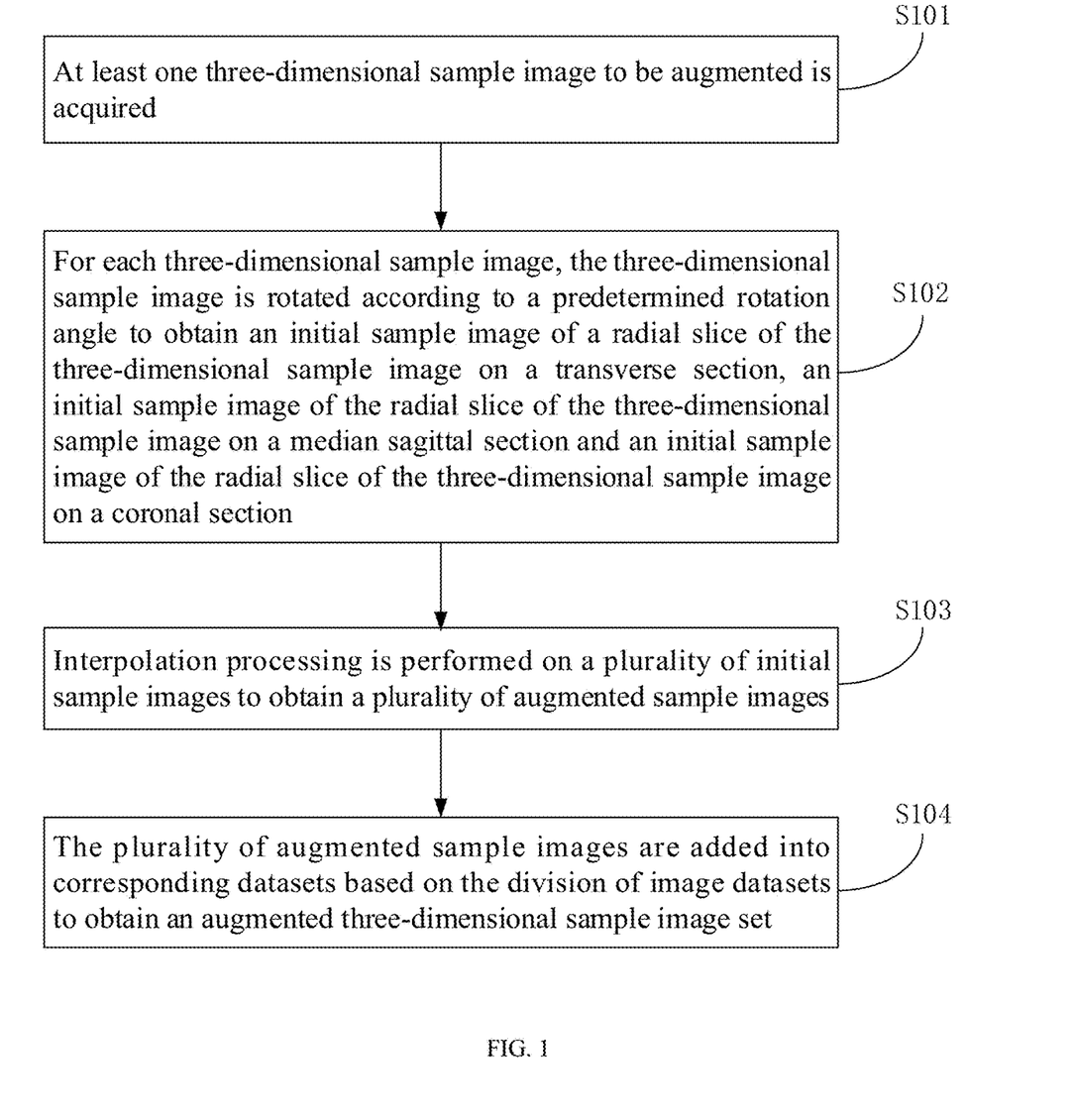
FIG. 1 is a flowchart of a method for augmenting data of a three-dimensional image according to one or more embodiments of the invention.

Refer to FIG. 1, which is a flowchart of a method for augmenting data of a three-dimensional image according to one or more embodiments of the invention. As shown in FIG. 1, at least one embodiment of the invention provides a method for augmenting data of a three-dimensional image, which includes the following steps.

In S101, at least one three-dimensional sample image to be augmented is acquired.

In S102, for each three-dimensional sample image, the three-dimensional sample image is rotated according to a predetermined rotation angle to obtain an initial sample image of a radial slice of the three-dimensional sample image on a transverse section, an initial sample image of the radial slice of the three-dimensional sample image on a median sagittal section and an initial sample image of the radial slice of the three-dimensional sample image on a coronal section.

In S103, interpolation processing is performed on a plurality of initial sample images to obtain a plurality of augmented sample images.

In S104, the plurality of augmented sample images are added into corresponding datasets based on the division of image datasets to obtain an augmented three-dimensional sample image set.

In the method for augmenting data of the three-dimensional image according to at least one embodiment of the invention, the three-dimensional sample image is directly processed to obtain an initial sample image of the radial slice of the three-dimensional sample image on different sections.

After interpolation processing is performed on the initial sample imaged, a plurality of augmented sample images are obtained. The plurality of augmented sample images are added to the corresponding datasets, and the three-dimensional characteristics of the image data are preserved as much as possible. The augmented sample image is derived from an initial three-dimensional image, which can improve the authenticity of the augmented three-dimensional sample image.

Various exemplary steps of the at least one embodiment of the invention are described hereinafter.

In S101, at least one three-dimensional sample image to be augmented is acquired.

In the at least one embodiment of the invention, with the continuous development of artificial intelligence technology, image processing technology based on deep learning has become more mature and has become more and more widely used. In the process of deep learning technology, a large number of image data need to be trained. A learning model trained by the Artificial Intelligence (AI) technology driven by a dataset requires a huge and diverse training dataset to ensure robustness and interoperability. However, due to the limitation of time and cost, there may be often situations in which the number of images is small, the image quality is poor and the categories are unbalanced. Therefore, data augmentation has become a promising and cost-effective technology to increase the size and diversity of training datasets. Through the technology of increasing data, the effect of enriching the dataset itself, improving the performance of a corresponding classification detection system, and expanding the extended value can be achieved. The at least one embodiment of the invention is an optimization scheme of augmenting data based on the background of data augmentation.

In one possible implementation, the three-dimensional sample image to be augmented can be a sample image that can be acquired in a database. Taking the three-dimensional sample image to be augmented as a medical image as an example, the three-dimensional sample image to be augmented can be acquired from a MICCAI dataset and a pneumonia dataset.

A pneumonia dataset is derived from the intelligent medical laboratory of the University of Electronic Science and Technology of China, which contains three-dimensional CT images of 120 patients stored in an NIFTI format. However, 50 images were labeled by experts, and the remaining 70 images were non-expert labeled data with noise. The labels only contain the lesion area.

Further, in order to acquire more abundant training set sample images, after acquiring the three-dimensional sample images to be augmented in the dataset, it is necessary to perform data augmentation for each three-dimensional sample image.

In the at least one embodiment of the invention, based on the inspiration of a K-space filling mode, a method for augmenting image data with a radial slice is proposed. That is, under the existing Cartesian coordinate representation, radial slices are added and properly interpolated to express a new two-dimensional image, thus realizing data expansion. In order to simplify the implementation difficulty, an affine rotation algorithm is used to slice the three-dimensional sample image radially.

K-space is a dual space of an image space under the Fourier transform, which indicates an array of spatial frequencies in MR images (nuclear magnetic resonance images) and is mainly used in quantum calculation and imaging analysis of magnetic resonance imaging. k corresponds to the wave number appearing in wave mathematics, which can be deemed as a concept of "spatial frequency". The projection curve of MR signals in the K-space is referred to as a K-trajectory, which is also referred to as a Fourier line.

Before the MR signals are generated, the k space is just an array of blank cells waiting for data to arrive. The data filling the K-space is directly taken from the MR signals, but the data can be acquired in any order.

In S102, for each three-dimensional sample image, the three-dimensional sample image is rotated according to a set rotation angle to obtain an initial sample image of a radial slice of the three-dimensional sample image on a transverse section, an initial sample image of the radial slice of the three-dimensional sample image on a median sagittal section and an initial sample image of the radial slice of the three-dimensional sample image on a coronal section.

In the at least one embodiment of the invention, compared with other methods aiming at image data augmentation, which mostly aim at two-dimensional images, the medical lesion images in the one or more embodiments of the invention are generally three-dimensional images. Therefore, the scheme in the at least one embodiment of the invention is to directly process the three-dimensional images and carry out data augmentation.

Specifically, for each three-dimensional sample image, the three-dimensional sample image needs to be rotated, and at the same time, the initial sample image of the radial slice of the three-dimensional sample image on the transverse section, the initial sample image of the radial slice of the three-dimensional sample image on the median sagittal section and the initial sample image of the radial slice of the three-dimensional sample image on the coronal section are acquired. Different radial slice images are processed, respectively, to obtain augmented data.

Specifically, the transverse section runs from top (head) to bottom (foot). The coronal section runs from front to back. The median sagittal section runs from left to right. Taking the human body as an example, the transverse section is seen from the top of the head to the bottom (in the direction from head to foot). The section is referred to as the transverse section in English. CT usually uses the transverse section. The anatomical section divides the human body into two sides (the left and right sides of the human body). The section parallel to this section is also referred to as a median sagittal section, and this position is referred to as the median sagittal position. The section is referred to as the median sagittal section in English. The human body is cut longitudinally into all sections of the left and right parts in a direction from front to back. The coronal section is a section which cuts the human body longitudinally into two parts (front chest and back) along the long axis of the human body in a direction from left to right. The section is referred to as the coronal section in English. The section passing through the vertical axis and the horizontal axis and all sections parallel to the vertical axis and the horizontal axis are referred to as the coronal section. These sections divide the human body into a front part and a back part.

Figure 2:
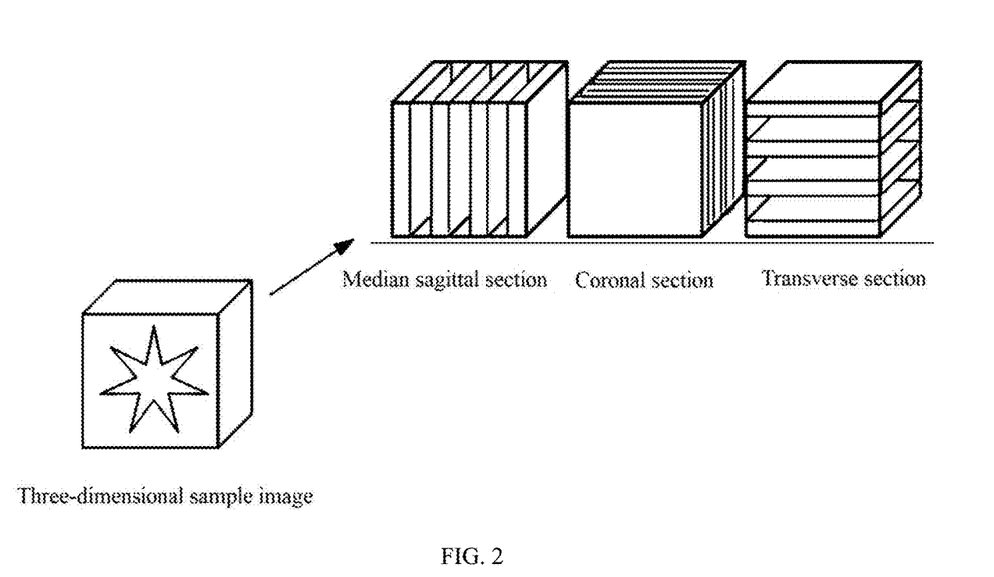
FIG. 2 is a schematic diagram of each cutting surface according to one or more embodiments of the invention.

Refer to FIG. 2, which is a schematic diagram of each cutting section according to one or more embodiments of the invention. As shown in FIG. 2, after slicing the three-dimensional sample image in different directions, the initial sample image of the radial slice of the three-dimensional sample image on the transverse section, the initial sample image of the radial slice of the three-dimensional sample image on the median sagittal section and the initial sample image of the radial slice of the three-dimensional sample image on the coronal section m be obtained.

Next, the process of acquiring the initial sample image of the radial slice of the three-dimensional sample image on the transverse section, the initial sample image of the radial slice of the three-dimensional sample image on the median sagittal section and the initial sample image of the radial slice of the three-dimensional sample image on the coronal section for each three-dimensional sample image will be described, respectively.

In a first aspect, the process of acquiring the initial sample image of the radial slice of the three-dimensional sample image on the transverse section is as follows.

Specifically, the step of "for each three-dimensional sample image, rotating the three-dimensional sample image according to a predetermined rotation angle to obtain an initial sample image of a radial slice of the three-dimensional sample image on a transverse section" includes the following steps.

In a1: for each three-dimensional sample image, a three-dimensional Cartesian coordinate system is established based on the three-dimensional sample image.

In a2: for each three-dimensional sample image, a first dimension of the three-dimensional sample image in a longitudinal axis direction is determined, and a first rotation angle is determined based on the first dimension.

In a3: for each three-dimensional sample image, with a vertical axis in the three-dimensional Cartesian coordinate system as a rotation axis, the three-dimensional sample image is rotated according to the first rotation angle to obtain a plurality of first rotating radial slice images.

In a4: for each three-dimensional sample image, longitudinal axial sectional images in each of the first rotating radial slice images are collected to obtain the initial sample image of the radial slice of the three-dimensional sample image on the transverse section.

In the at least one embodiment of the invention, since the disclosure is a data processing process of directly augmenting the data of the three-dimensional image, when establishing the Cartesian coordinate system, the three-dimensional Cartesian coordinate system is established based on the three-dimensional sample image.

In one possible implementation, the angle of rotating the sample image can be based on the dimension in the image direction. The rotation angles in different directions (the median sagittal section, the coronal section and the transverse section) are different, and the number of radial images obtained is not necessarily the same. Therefore, it is necessary to determine the first rotation angle for each rotation when acquiring the radial slice of the transverse section according to the first dimension of three-dimensional sample images in the longitudinal axis direction.

Specifically, the variation range of the rotation angle may be [0,360]. For images with a large size (with a thick dimension), fine-grained angular rotation can be used when the lesion changes a lot, such as 0.5 degrees. When the image size is small (with a thin dimension), a larger interval can be used, such as 5 or 10 degrees, so as to avoid the situation that a small image size (with a thin dimension) results in too dense rotation, produces more similar images and causes data redundancy.

In one possible implementation, when acquiring the initial sample image of the radial slice of the three-dimensional sample image on the transverse section, taking the vertical axis in the three-dimensional Cartesian coordinate system as the rotation axis, the three-dimensional sample image is rotated according to the first rotation angle determined based on the dimension in the longitudinal axis direction, so as to obtain the first rotating radial slice image at each angle. When acquiring valid data, instead of acquiring the first rotating radial slice image at each angle, the longitudinal axial sectional image of the image is acquired for each first rotating radial slice image, and a plurality of longitudinal axial sectional images are spliced according to a decreasing order of the corresponding rotation angles (for example, from 0 degree to 360 degrees, etc.), so as to obtain the initial sample image of the radial slice of the three-dimensional sample image on the transverse section.

In a second aspect, the process of obtaining the initial sample image of the radial slice of the three-dimensional sample image on the median sagittal section is as follows.

Specifically, for each three-dimensional sample image, an initial sample image of the radial slice of the three-dimensional sample image on a median sagittal section is obtained by the following steps.

In b1: for each three-dimensional sample image, a second dimension of the three-dimensional sample image in a horizontal axis direction is determined, and a second rotation angle is determined based on the second dimension.

In b2: for each three-dimensional sample image, with the vertical axis in the three-dimensional Cartesian coordinate system as the rotation axis, the three-dimensional sample image is rotated according to the second rotation angle to obtain a plurality of second rotating radial slice images.

In b3: for each three-dimensional sample image, longitudinal axial sectional images in each of the second rotating radial slice images are collected to obtain the initial sample image of the radial slice of the three-dimensional sample image on the median sagittal section.

In the at least one embodiment of the invention, similarly, the three-dimensional Cartesian coordinate system is also established directly for the three-dimensional image. It is worth noting that the three-dimensional Cartesian coordinate system established for the process of acquiring the median sagittal section is consistent with the three-dimensional Cartesian coordinate system established for the process of acquiring the transverse section, that is, the coordinate selection points and the direction selection of each coordinate axis are consistent.

In one possible implementation, similarly, the rotation angle of the sample image can be based on the dimension in the image direction. It is necessary to determine the second rotation angle for each rotation according to the second dimension of the three-dimensional sample image in the horizontal axis direction when acquiring the radial slice of the median sagittal section.

In one possible implementation, similarly, when acquiring the initial sample image of the radial slice of the three-dimensional sample image on the median sagittal section, taking the vertical axis in the three-dimensional Cartesian coordinate system as the rotation axis, the three-dimensional sample image is rotated according to the second rotation angle determined based on the dimension in the horizontal axis direction to obtain the second rotating radial slice image at each angle. When acquiring valid data, instead of acquiring the second rotating radial slice image at each angle, the horizontal axial sectional image of the image is acquired for each second rotating radial slice image, and a plurality of horizontal axial sectional images are spliced according to a decreasing order of the corresponding rotation angles (for example, from 0 degree to 360 degree, etc.), so as to obtain the initial sample image of the radial slice of the three-dimensional sample image on the median sagittal section.

In a third aspect, the process of obtaining the initial sample image of the radial slice of the three-dimensional sample image on the coronal section is as follows.

Specifically, for each three-dimensional sample image, an initial sample image of the radial slice of the three-dimensional sample image on a coronal section is obtained by the following steps:

In c1: for each three-dimensional sample image, a third dimension of the three-dimensional sample image in a vertical axis direction is determined, and a third rotation angle is determined based on the third dimension.

In c2: for each three-dimensional sample image, with a horizontal axis or the vertical axis in the three-dimensional Cartesian coordinate system as the rotation axis, the three-dimensional sample image is rotated according to the third rotation angle to obtain a plurality of third rotating radial slice images.

In c3: for each three-dimensional sample image, horizontal axial sectional images in each of the third rotating radial slice images are collected to obtain the initial sample image of the radial slice of the three-dimensional sample image on the coronal section.

In the at least one embodiment of the invention, similarly, the three-dimensional Cartesian coordinate system is also established directly for the three-dimensional image. It is worth noting that the three-dimensional Cartesian coordinate system established for the process of acquiring the coronal section is consistent with the three-dimensional Cartesian coordinate system established for the process of acquiring the transverse section and the median sagittal section, that is, the coordinate selection points and the direction selection of each coordinate axis are consistent.

In one possible implementation, similarly, the rotation angle of the sample image can be based on the dimension in the image direction. It is necessary to determine the third rotation angle for each rotation according to the third dimension of the three-dimensional sample image in the vertical axis direction when acquiring the radial slice of the coronal section.

In one possible implementation, similarly, when acquiring the initial sample image of the radial slice of the three-dimensional sample image on the coronal section, taking the horizontal axis or the vertical axis in the three-dimensional Cartesian coordinate system as the rotation axis, the three-dimensional sample image is rotated according to the third rotation angle determined based on the dimension in the vertical axis direction to obtain the third rotating radial slice image at each angle. When acquiring valid data, instead of acquiring the third rotating radial slice image at each angle, the vertical axial sectional image of the image is acquired for each third rotating radial slice image, and a plurality of vertical axial sectional images are spliced according to a decreasing order of the corresponding rotation angles (for example, from 0 degree to 360 degree, etc.) to obtain the initial sample image of the radial slice of the three-dimensional sample image on the coronal section.

Figure 3:
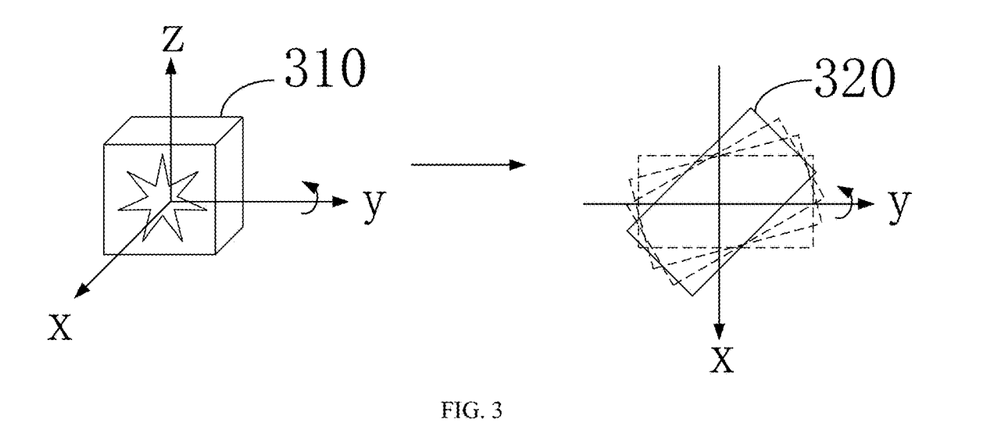
FIG. 3 is a schematic top view of the radial rotation of a three-dimensional sample image according to one or more embodiments of the invention.

For example, refer to FIG. 3, which is a schematic top view of the radial rotation of a three-dimensional sample image according to one or more embodiments of the invention. As shown in FIG. 3, taking the initial sample image of the radial slice on the transverse section obtained by rotating the three-dimensional sample image as an example, a three-dimensional Cartesian coordinate system is established based on the three-dimensional sample image 310. At the same time, the three-dimensional image is rotated with the vertical axis in the three-dimensional Cartesian coordinate system as the rotation axis to obtain a plurality of initial sample images 320 of the radial slices at different rotation angles.

Figure 4:
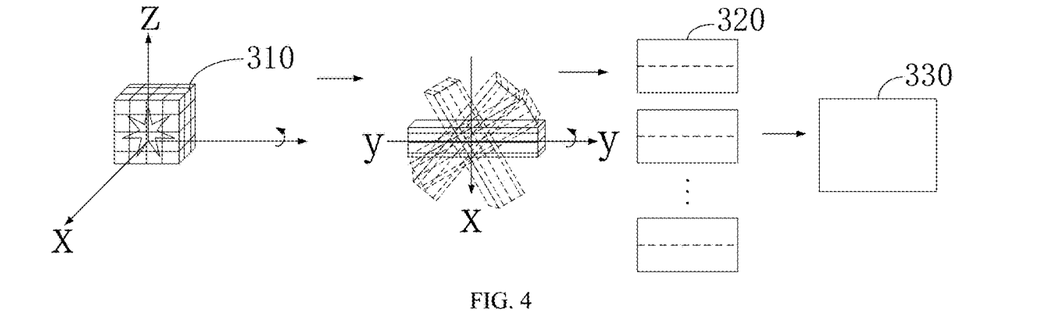
FIG. 4 is a schematic diagram of the radial rotation of the three-dimensional sample image according to one or more embodiments of the invention.

For example, refer to FIG. 4, which is a schematic diagram of the radial rotation of a three-dimensional sample image according to one or more embodiments of the invention. As shown in FIG. 4, taking the initial sample image of the radial slice on the transverse section obtained by rotating the three-dimensional sample image as an example, a three-dimensional Cartesian coordinate system is established based on the three-dimensional sample image 310. At the same time, the three-dimensional image is rotated with the vertical axis in the three-dimensional Cartesian coordinate system as the rotation axis to obtain a plurality of initial sample images 320 of the radial slices at different rotation angles. Furthermore, the value connecting lines of each initial sample image 320 on the vertical axis are spliced to obtain a coronal section radial slice 330.

Further, after the initial sample image of the radial slice of the three-dimensional sample image on the transverse section, the initial sample image of the radial slice of the three-dimensional sample image on the median sagittal section and the initial sample image of the radial slice of the three-dimensional sample image on the coronal section are acquired by rotating the three-dimensional sample image according to the predetermined rotation angle for each three-dimensional sample image, since numerical values may be missing in the process of rotating the image, interpolation compensation is required for the acquired initial sample images.

In S103, interpolation processing is performed on the plurality of initial sample images to obtain a plurality of augmented sample images.

In the at least one embodiment of the invention, the three-dimensional sample image to be augmented includes a three-dimensional original sample image and a three-dimensional truth sample image. For medical images, the three-dimensional truth sample images are obtained in a manner of being manually labeled by experts and doctors (the lesion areas in the images are labeled and expressed by labels, for example, the label corresponding to the lesion areas in the medical images is 1, and the label corresponding to the non-lesion areas in the medical images is 0), and the three-dimensional truth sample images have no original expression in a three-dimensional format. The three-dimensional truth sample image is constructed based on the corresponding relationship between a labeled two-dimensional truth image and a slice image.

In one possible implementation, since the value of the label in the truth image only contains a few fixed values, the three-dimensional original sample image and the three-dimensional truth sample image have different interpolation processing methods. The method of performing interpolation processing on the three-dimensional original sample image and the three-dimensional truth sample image to obtain the augmented sample image will be described hereinafter.

In a first aspect, in a case that the three-dimensional sample image corresponding to the initial sample image is the three-dimensional original sample image, for each initial sample image, a plurality of augmented sample images are obtained by the following steps.

In d1: for each initial sample image, a pixel value of a missing pixel point in the initial sample image is calculated based on a pixel value of each pixel in the initial sample image.

In d2: for each initial sample image, the initial sample image is filled according to the pixel value of the missing pixel point to obtain the augmented sample image corresponding to the initial sample image.

In the at least one embodiment of the invention, it is necessary to first determine the pixel value of each pixel in the initial sample image, calculate the pixel value of the missing pixel point in the initial sample image, and then fill the initial sample image according to the pixel value of the missing pixel point for each initial sample image.

Specifically, a cubic interpolation method can be used for interpolation processing. Specifically, the cubic interpolation method is a polynomial interpolation method, which is the method of successively approximating a minimum point of a cubic curve $\varphi(t)=a_0+a_1t+a_2t^2+a_3t^3$ to find a minimum point of function f(t).

In a second aspect, in a case that the three-dimensional sample image corresponding to the initial sample image is the three-dimensional truth sample image, for each initial sample image, a plurality of augmented sample images are obtained by the following steps.

In e1: at least one label value corresponding to the three-dimensional truth sample image is determined.

In e2: for each initial sample image, the pixel value of the missing pixel point in the initial sample image is calculated based on the pixel value of each pixel in the initial sample image.

In e3: for each initial sample image, similarity clustering is performed on the pixel value in the initial sample image which is not equal to any label value in the three-dimensional truth sample image according to a similar pixel value area in the corresponding three-dimensional original sample image, so as to obtain a corrected pixel value.

In e4: for each initial sample image, the initial sample image is filled according to the pixel value of the missing pixel point or the corrected pixel value to obtain the augmented sample image corresponding to the initial sample image.

In the at least one embodiment of the invention, for the interpolation method that the three-dimensional sample image is the three-dimensional truth sample image, the pixel value of each missing position in the image is also calculated based on the cubic interpolation method. However, since the image pixels in the three-dimensional truth image store the label value, for the three-dimensional truth image, the label value is fixed. Therefore, after the pixel value of each missing position in the image is calculated by the cubic interpolation method, it is also necessary to adjust the pixel value that does not meet the label value, so that the pixel value is the same as the label value and the accuracy of the pixel value in the three-dimensional truth image is ensured.

Specifically, the augmented sample image corresponding to the initial sample image can be obtained by performing similarity clustering analysis according to the comparison of multi-scale feature similarity correspondingly to the similar data area when interpolating the three-dimensional truth image.

Further, after processing each three-dimensional sample image to obtain a plurality of augmented sample images, the obtained plurality of augmented sample images can be correspondingly added to the dataset to complete the augmenting data process, and then the deep learning model is trained based on the dataset after augmenting data.

In S104, the plurality of augmented sample images are added into corresponding datasets based on the division of image datasets to obtain an augmented three-dimensional sample image set.

In the at least one embodiment of the invention, the dataset for deep learning is generally divided into a training set and a test set. The depth model learning is trained through the sample data in the training set. After finishing training the depth model, the accuracy of the trained depth model in predicting unknown samples is evaluated through the test data in the test set (detecting the generalization ability of the model). Generally, the data contained in the training set and the test set is different.

Therefore, when classifying the datasets of a plurality of augmented sample images, it is necessary to divide and add data according to the datasets to which a plurality of augmented sample images belong.

Specifically, the step of "adding the plurality of augmented sample images into corresponding datasets based on division of image datasets to obtain an augmented three-dimensional sample image set" includes the following steps.

In f1: for each augmented sample image, whether the three-dimensional sample image corresponding to the augmented sample image belongs to a sample image in a training set or a sample image in a test set is determined.

In f2: in response to a determination that the three-dimensional sample image corresponding to the augmented sample image belongs to the sample image in the training set, the augmented sample image is added to the training set.

In f3: in response to a determination that the three-dimensional sample image corresponding to the augmented sample image belongs to the sample image in the test set, in a case that a rotation angle corresponding to the augmented sample is greater than a predetermined rotation angle threshold, the augmented sample image is added to the training set.

In the at least one embodiment of the invention, there are two specific augmenting data strategies. One of the specific augmenting data strategies only slices the three-dimensional sample images in the dataset radially based on the original division of the training set and the test set to obtain a plurality of augmented sample images, and add the plurality of augmented sample images to the training set, and the data in the test set remains unchanged. The other specific augmenting data strategy is to directly add the augmented sample image to the training set based on the original division of the training set and the test set, if it is determined that the three-dimensional sample image corresponding to the augmented sample image belongs to the sample image in the training set. For the data in the test set, radial slicing processing is also required, that is, in a case that it is determined that the augmented data images belong to the sample images in the test set, not all of the plurality of augmented sample images are added to the training set, but the images corresponding to the augmented samples in the test set in which the rotation angle is greater than a predetermined rotation angle threshold are added to the training set, where the rotation angle threshold can be 20 degrees, which can ensure that similar test set data are not introduced to the training set. The above-mentioned test set data introduced to the training set is referred to as a homologous radial slice.

For the first augmenting data strategy, the data volume can be increased, but the newly added data volume of the radial image will increase several times, and some original data features will be submerged by new features, resulting in data imbalance. For the second augmenting data strategy, the balance and the objectivity of data can be ensured while acquiring a variety of data.

In the at least one embodiment of the invention, taking the segmentation models UNet and nnUNet as examples, the original dataset and newly added dataset are verified by experiments, and the verification results are shown in Table 1 to Table 4.

Table 1 presents the results of the UNet model on the MICCAI dataset.

TABLE 1

Data table of the results for the UNet model on the MICCAI dataset

| Datasets | Metrics | | | | | |
|---|---|---|---|---|---|---|
| | Results of Dice (↑) | | | Hausdorff distance (↓) | | |
| | Whole Tumor | Tumor Core | Enhanced Tumor | Whole Tumor | Tumor Core | Enhanced Tumor |
| Original dataset | 0.7329 | 0.8873 | 0.9100 | 1.6051 | 0.8570 | 0.6618 |
| Full dataset (including original data and added radial slice data) | 0.7613 | 0.8922 | 0.9124 | 1.5394 | 0.8316 | 0.6591 |

Table 2 presents the results of the nnUNet model on the MICCAI dataset:

TABLE 2

Data table of the results for the nnUNet model on the MICCAI dataset

| Datasets | Metrics | | | | | |
|---|---|---|---|---|---|---|
| | Results of Dice (↑) | | | Hausdorff distance (↓) | | |
| | Whole Tumor | Tumor Core | Enhanced Tumor | Whole Tumor | Tumor Core | Enhanced Tumor |
| Original dataset | 0.7988 | 0.8757 | 0.8896 | 1.4345 | 0.8363 | 0.6920 |
| Full dataset (including original data and added radial slice data) | 0.8219 | 0.8946 | 0.9056 | 1.3750 | 0.7864 | 0.6519 |

Table 3 presents the results of the Unet model on the UES dataset:

TABLE 3

Data table of the results for the Unet model on the UES dataset

| Datasets | Metrics | | | |
|---|---|---|---|---|
| | Results of Dice (↑) | Positive predictive value (↑) | True positive Rate (↑) | Hausdorff distance (↓) |
| Original dataset | 0.6796 | 0.7070 | 0.8734 | 3.8643 |
| Full dataset (including original data and added radial slice data) | 0.6971 | 0.7211 | 0.8641 | 3.8104 |

Table 4 presents the results of the nnUNet model on the UES dataset:

TABLE 4

Data table of the results for the nnUNet model on the UES dataset

| Datasets | Metrics | | | |
|---|---|---|---|---|
| | Results of Dice (↑) | Positive predictive value (↑) | True positive Rate (↑) | Hausdorff distance (↓) |
| Original dataset | 0.8054 | 0.8430 | 0.8635 | 3.2837 |
| Full dataset (including original data and added radial slice data) | 0.8057 | 0.8490 | 0.8732 | 3.2276 |

The tables include datasets and metrics. Taking the brain tumor image data as an example, after being segmented by a segmentation model, the brain tumor images can be segmented into three categories: whole tumor (WT), tumor core (TC) and enhanced tumor (ET). The evaluation metrics include the results from following three categories: whole tumor (WT), tumor core (TC) and enhanced tumor (ET). The evaluation indexes include: the Dice coefficient, also known as the Dice score, which is a statistical measure that quantifies the similarity or overlap between two sets of data, such as predicted and ground truth segmentation masks, and is calculated as the harmonic average of the precision and the recall rate. The Haussdorff distance (Haussdorff95) is a metric that describes the degree of similarity between two sets of points, in which the Hausdorff95 value represents the 95th percentile of the Hausdorff distances between the two sets, in order to eliminate the influence of a very small subset of outliers. The precision (PPV(Precision)) is also referred to as a positive predictive value. The true positive rate (TPR) is also referred as the sensitivity and the recall rate, which measures the positive voxel in the real background, that is, the ability to segment the area of interest in segmentation experiments. The 're' is an original dataset (the original MICCAI training dataset contains 17,601 images; the original USE-part2 training dataset contains 2589 images), and the 'add' indicates that the training dataset was augmented by adding radial slices. Specifically, the augmented MICCAI training dataset contains 90,564 images, and the augmented USE_part2 training dataset contains 9,271 images. The experiments were conducted using the same test datasets across all conditions.

It can be seen from the experimental results that the increase of radial slices and homologous radial slices have obvious effects on improving the data results.

The at least one embodiment of the invention provides a method for augmenting data of a three-dimensional image, including: acquiring at least one three-dimensional sample image to be augmented; rotating, for each three-dimensional sample image, the three-dimensional sample image according to a predetermined rotation angle to obtain an initial sample image of a radial slice of the three-dimensional sample image on a transverse section, an initial sample image of the radial slice of the three-dimensional sample image on a median sagittal section and an initial sample image of the radial slice of the three-dimensional sample image on a coronal section; performing interpolation processing on a plurality of initial sample images to obtain a plurality of augmented sample images; and adding the plurality of augmented sample images into corresponding datasets based on the division of image datasets to obtain an augmented three-dimensional sample image set. In this way, the three-dimensional sample image is directly processed to obtain an initial sample image of the radial slice of the three-dimensional sample image on different sections. After interpolation processing is performed on the initial sample imaged, a plurality of augmented sample images are obtained. The plurality of augmented sample images are added to the corresponding datasets, and the three-dimensional characteristics of the image data are preserved as much as possible. The augmented sample image is derived from an initial three-dimensional image, which can improve the authenticity of the augmented three-dimensional sample image.

Based on the same inventive concept, the at least one embodiment of the invention further provides an apparatus for augmenting data of a three-dimensional image, which corresponds to the method for augmenting data of the three-dimensional image. Since the principle of solving problems using the apparatus in the at least one embodiment of the invention is similar to the method for augmenting data of the three-dimensional image in the at least one embodiment of the invention, the implementation of the apparatus can refer to the implementation of the method, and the same part will not be described in detail here.

Figure 5:
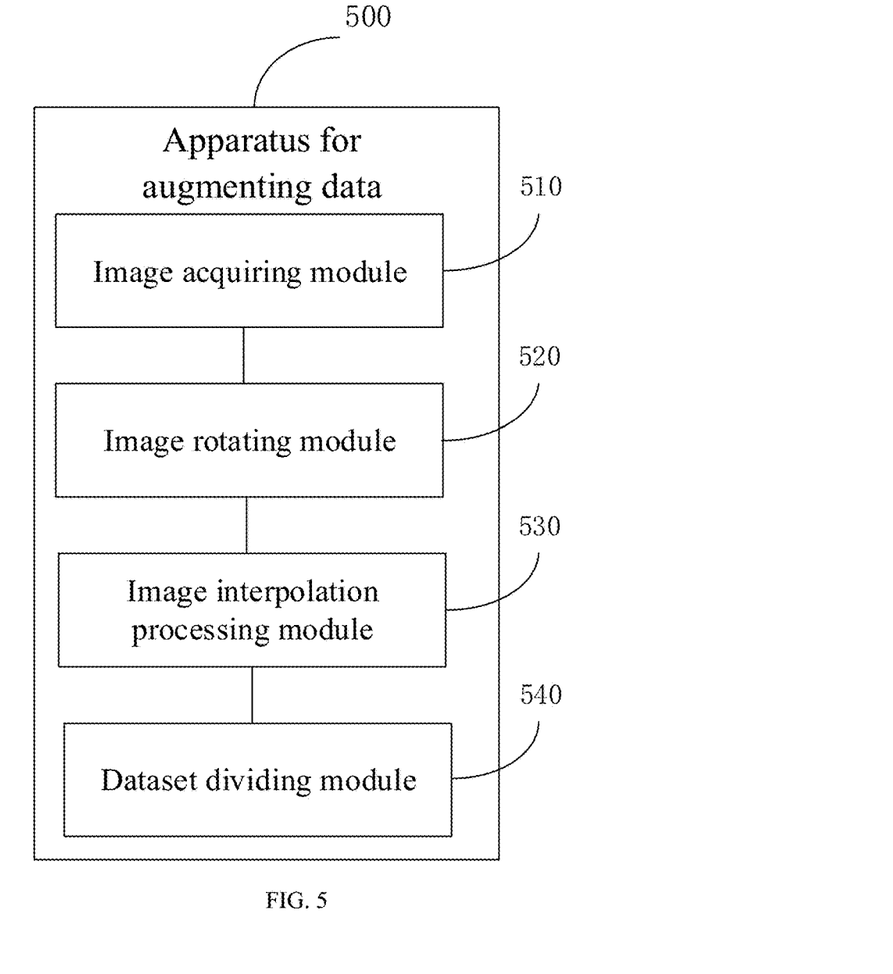
FIG. 5 is a schematic structural diagram of an apparatus for augmenting data of a three-dimensional image according to one or more embodiments of the invention.

Refer to FIG. 5, which is a schematic structural diagram of an apparatus for augmenting data of a three-dimensional image according to one or more embodiments of the invention. As shown in FIG. 5, the apparatus for augmenting data 500 includes: an image acquiring module 510, an image rotating module 520, an image interpolation processing module 530 and a dataset dividing module 540.

The image acquiring module 510 is configured to acquire at least one three-dimensional sample image to be augmented.

The image rotating module 520 is configured to rotate, for each three-dimensional sample image, the three-dimensional sample image according to a predetermined rotation angle to obtain an initial sample image of a radial slice of the three-dimensional sample image on a transverse section, an initial sample image of the radial slice of the three-dimensional sample image on a median sagittal section and an initial sample image of the radial slice of the three-dimensional sample image on a coronal section.

The image interpolation processing module 530 is configured to perform interpolation processing on a plurality of initial sample images to obtain a plurality of augmented sample images.

The dataset dividing module 540 is configured to add the plurality of augmented sample images into corresponding datasets based on the division of image datasets to obtain an augmented three-dimensional sample image set.

In a possible implementation, when the image rotating module 520 is configured to rotate, for each three-dimensional sample image, the three-dimensional sample image according to a predetermined rotation angle to obtain an initial sample image of a radial slice of the three-dimensional sample image on a transverse section, the image rotating module 520 is configured to:

establish, for each three-dimensional sample image, a three-dimensional Cartesian coordinate system based on the three-dimensional sample image;

determine, for each three-dimensional sample image, a first dimension of the three-dimensional sample image in a longitudinal axis direction, and determine a first rotation angle based on the first dimension;

for each three-dimensional sample image, with a vertical axis in the three-dimensional Cartesian coordinate system as a rotation axis, rotate the three-dimensional sample image according to the first rotation angle to obtain a plurality of first rotating radial slice images; and collect, for each three-dimensional sample image, longitudinal axial sectional images in each of the first rotating radial slice images to obtain the initial sample image of the radial slice of the three-dimensional sample image on the transverse section.

In one possible implementation, for each three-dimensional sample image, the image rotating module 520 is configured to obtain an initial sample image of the radial slice of the three-dimensional sample image on a median sagittal section by following steps:

for each three-dimensional sample image, determining a second dimension of the three-dimensional sample image in a horizontal axis direction, and determining a second rotation angle based on the second dimension;

for each three-dimensional sample image, with the vertical axis in the three-dimensional Cartesian coordinate system as the rotation axis, rotating the three-dimensional sample image according to the second rotation angle to obtain a plurality of second rotating radial slice images; and for each three-dimensional sample image, collecting horizontal axial sectional images in each of the second rotating radial slice images to obtain the initial sample image of the radial slice of the three-dimensional sample image on the median sagittal section.

In one possible implementation, for each three-dimensional sample image, the image rotating module 520 is configured to obtain an initial sample image of the radial slice of the three-dimensional sample image on a coronal section by following steps:

for each three-dimensional sample image, determining a third dimension of the three-dimensional sample image in a vertical axis direction, and determining a third rotation angle based on the third dimension;

for each three-dimensional sample image, with a horizontal axis or the vertical axis in the three-dimensional Cartesian coordinate system as the rotation axis, rotating the three-dimensional sample image according to the third rotation angle to obtain a plurality of third rotating radial slice images; and for each three-dimensional sample image, collecting horizontal axial sectional images in each of the third rotating radial slice images to obtain the initial sample image of the radial slice of the three-dimensional sample image on the coronal section.

In a possible implementation, the three-dimensional sample image includes a three-dimensional original sample image and a three-dimensional truth sample image; where the three-dimensional truth sample image is constructed based on the corresponding relationship between a labeled two-dimensional truth image and a slice image; in a case that the three-dimensional sample image corresponding to the initial sample image is the three-dimensional original sample image, for each initial sample image, the image interpolation processing module 530 is configured to obtain a plurality of augmented sample images by following steps:

for each initial sample image, calculating a pixel value of a missing pixel point in the initial sample image based on a pixel value of each pixel in the initial sample image; and for each initial sample image, filling the initial sample image according to the pixel value of the missing pixel point to obtain the augmented sample image corresponding to the initial sample image.

In a possible implementation, in a case that the three-dimensional sample image corresponding to the initial sample image is the three-dimensional truth sample image, for each initial sample image, the image interpolation processing module 530 is configured to obtain a plurality of augmented sample images by following steps:

determining at least one label value corresponding to the three-dimensional truth sample image;
  for each initial sample image, calculating the pixel value of the missing pixel point in the initial sample image based on the pixel value of each pixel in the initial sample image;
  for each initial sample image, performing similarity clustering on the pixel value in the initial sample image which is not equal to any label value in the three-dimensional truth sample image according to a similar pixel value area in the corresponding three-dimensional original sample image, so as to obtain a corrected pixel value; and
  for each initial sample image, filling the initial sample image according to the pixel value of the missing pixel point or the corrected pixel value to obtain the augmented sample image corresponding to the initial sample image.

In a possible implementation, when the dataset dividing module 540 is configured to add the plurality of augmented sample images into corresponding datasets based on the division of image datasets to obtain an augmented three-dimensional sample image set, the dataset dividing module 540 is configured to:

determine, for each augmented sample image, whether the three-dimensional sample image corresponding to the augmented sample image belongs to a sample image in a training set or a sample image in a test set;
  add, in response to a determination that the three-dimensional sample image corresponding to the augmented sample image belongs to the sample image in the training set, the augmented sample image to the training set;
  add, in response to a determination that the three-dimensional sample image corresponding to the augmented sample image belongs to the sample image in the test set, the augmented sample image to the training set in a case that a rotation angle corresponding to the augmented sample is greater than a predetermined rotation angle threshold.

The at least one embodiment of the invention provides a method for augmenting data of a three-dimensional image, including: acquiring at least one three-dimensional sample image to be augmented; rotating, for each three-dimensional sample image, the three-dimensional sample image according to a predetermined rotation angle to obtain an initial sample image of a radial slice of the three-dimensional sample image on a transverse section, an initial sample image of the radial slice of the three-dimensional sample image on a median sagittal section and an initial sample image of the radial slice of the three-dimensional sample image on a coronal section; performing interpolation processing on a plurality of initial sample images to obtain a plurality of augmented sample images; and adding the plurality of augmented sample images into corresponding datasets based on division of image datasets to obtain an augmented three-dimensional sample image set. In this way, the three-dimensional sample image is directly processed to obtain an initial sample image of the radial slice of the three-dimensional sample image on different sections. After interpolation processing is performed on the initial sample image, a plurality of augmented sample images are obtained. The plurality of augmented sample images are added to the corresponding datasets, and the three-dimensional characteristics of the image data are preserved as much as possible. The augmented sample image is derived from an initial three-dimensional image, which can improve the authenticity of the augmented three-dimensional sample image.

Figure 6:
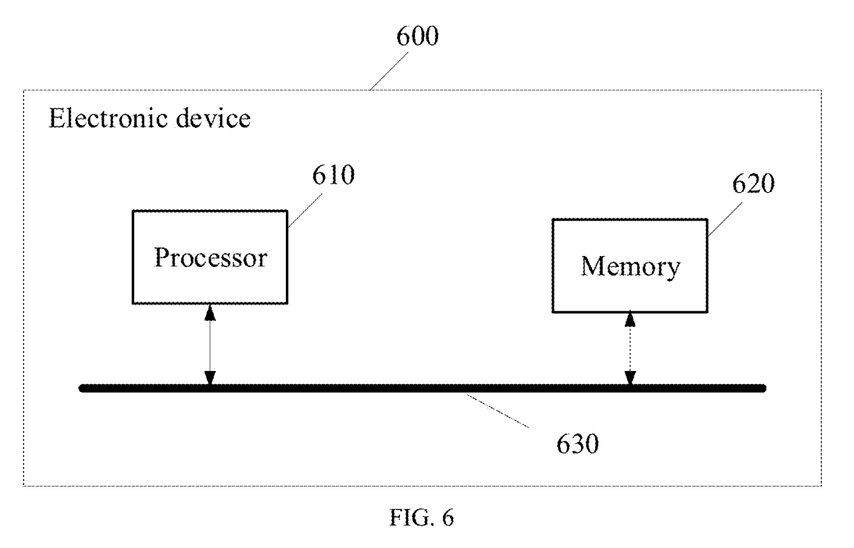
FIG. 6 is a schematic structural diagram of an electronic device according to one or more embodiments of the invention.

Refer to FIG. 6, which is a schematic structural diagram of an electronic device according to one or more embodiments of the invention. As shown in FIG. 6, the electronic device 600 includes a processor 610, a memory 620 and a bus 630.

The memory 620 stores machine-readable instructions executable by the processor 610. The processor 610 communicates with the memory 620 through the bus 630 when the electronic device 600 operates. The machine-readable instructions, when executed by the processor 610, can execute the steps of the method for augmenting data of the three-dimensional image in the method embodiment shown in FIG. 1. For the specific implementation, refer to the method embodiment, which will not be described in detail here.

The at least one embodiment of the invention further provides a non-transitory computer-readable storage medium. A computer program is stored in the computer-readable storage medium, and the computer program, when operated by a processor, can execute the steps of the method for augmenting data of the three-dimensional image in the method embodiment shown in FIG. 1. For the specific implementation, refer to the method embodiment, which will not be described in detail here.

It can be clearly understood by those skilled in the art that for the convenience and conciseness of description, the specific working processes of the system, the apparatus and the unit described above can refer to the corresponding processes in the aforementioned method embodiments, which will not be described in detail here.

In several embodiments provided by the invention, it should be understood that the disclosed system, apparatus and method can be realized in other ways. The apparatus embodiments described above are only schematic. For example, the division of the unit is only a logical function division, and there may be another division method in actual implementation. For example, a plurality of units or components may be combined or integrated into another system, or some features may be ignored or not implemented. On the other hand, the mutual coupling or direct coupling or communication connection shown or discussed can be indirect coupling or communication connection through some communication interfaces, apparatuses or units, which can be in electrical, mechanical or other forms.

The units described as separate components may or may not be physically separated. The components displayed as units may or may not be physical units, that is, they may be located in one place or distributed to a plurality of network units. Some or all of the units can be selected according to actual needs to achieve the purpose of this embodiment.

In addition, each functional unit in each embodiment of the invention can be integrated into one processing unit, or each unit can exist physically alone, or two or more units can be integrated into one unit.

If the functions are implemented in the form of software functional units and sold or used as independent products, they can be stored in a nonvolatile computer-readable storage medium executed by a processor. Based on this understanding, the technical scheme of the invention can be embodied in the form of a software product essentially or for the part that contributes to the prior art or the part of the technical scheme. The computer software product is stored in a storage medium and includes several instructions so that a computer device (which can be a personal computer, a server, a network device, etc.) executes all or part of the steps of the method described in various embodiments of the invention. The aforementioned storage media include: a U disk, a mobile hard disk, a Read-Only Memory (ROM), a Random Access Memory (RAM), a magnetic disk or an optical disk and other media that can store program codes.

Finally, it should be explained that the above-mentioned embodiments are only specific implementations of the invention, which are used to illustrate the technical scheme of the invention, rather than limit the technical scheme. The scope of protection of the invention is not limited thereto. Although the invention has been described in detail with reference to the above-mentioned embodiments, it should be understood by those skilled in the art that those skilled in the art can still modify or easily think of changes to the technical scheme described in the above-mentioned embodiments within the technical scope disclosed in the invention, or substitute some of the technical features equivalently. However, these modifications, changes or substitutions do not make the essence of the corresponding technical scheme deviate from the spirit and scope of the technical scheme of the at least one embodiment of the invention, and should be included in the scope of the protection of the invention. Therefore, the scope of the protection of the one or more embodiments of the invention should be based on the scope of the protection of the claims.

What is claimed is:

1. A method for augmenting data of a three-dimensional image, comprising:
    acquiring at least one three-dimensional sample image to be augmented;
    rotating each three-dimensional sample image of said at least one three-dimensional sample image according to a predetermined rotation angle to obtain an initial sample image of a radial slice of the each three-dimensional sample image on a transverse section, an initial sample image of the radial slice of the each three-dimensional sample image on a median sagittal section and an initial sample image of the radial slice of the each three-dimensional sample image on a coronal section;
    performing interpolation processing on a plurality of initial sample images to obtain a plurality of augmented sample images; and
    adding the plurality of augmented sample images into corresponding datasets based on division of image datasets to obtain an augmented three-dimensional sample image set;
    wherein the rotating said each three-dimensional sample image according to said predetermined rotation angle to obtain said initial sample image of said radial slice of the each three-dimensional sample image on said transverse section comprises
    for said each three-dimensional sample image, establishing a three-dimensional Cartesian coordinate system based on the each three-dimensional sample image;
    for said each three-dimensional sample image, determining a first dimension of the each three-dimensional sample image in a longitudinal axis direction, and determining a first rotation angle based on the first dimension;
    for said each three-dimensional sample image, with a vertical axis in the three-dimensional Cartesian coordinate system as a rotation axis, rotating the each three-dimensional sample image according to the first rotation angle to obtain a plurality of first rotating radial slice images;
    for said each three-dimensional sample image, collecting longitudinal axial sectional images in each first rotating radial slice image of the plurality of first rotating radial slice images to obtain the initial sample image of the radial slice of the each three-dimensional sample image on the transverse section;
    wherein for said each three-dimensional sample image, an initial sample image of the radial slice of the each three-dimensional sample image on a median sagittal section is obtained by
    for said each three-dimensional sample image, determining a second dimension of the each three-dimensional sample image in a horizontal axis direction, and determining a second rotation angle based on the second dimension;
    for said each three-dimensional sample image, with the vertical axis in the three-dimensional Cartesian coordinate system as the rotation axis, rotating the each three-dimensional sample image according to the second rotation angle to obtain a plurality of second rotating radial slice images; and
    for said each three-dimensional sample image, collecting horizontal axial sectional images in each second rotating radial slice image of the plurality of second rotating radial slice images to obtain the initial sample image of the radial slice of the each three-dimensional sample image on the median sagittal section;
    wherein for said each three-dimensional sample image, an initial sample image of the radial slice of the each three-dimensional sample image on a coronal section is obtained by
    for said each three-dimensional sample image, determining a third dimension of the each three-dimensional sample image in a vertical axis direction, and determining a third rotation angle based on the third dimension;
    for said each three-dimensional sample image, with a horizontal axis or the vertical axis in the three-dimensional Cartesian coordinate system as the rotation axis, rotating the each three-dimensional sample image according to the third rotation angle to obtain a plurality of third rotating radial slice images; and
    for said each three-dimensional sample image, collecting horizontal axial sectional images in each third rotating radial slice image of the plurality of third rotating radial slice images to obtain the initial sample image of the radial slice of the each three-dimensional sample image on the coronal section.

2. The method according to claim 1, wherein the each three-dimensional sample image comprises a three-dimensional original sample image and a three-dimensional truth sample image; wherein the three-dimensional truth sample image is constructed based on a corresponding relationship between a labeled two-dimensional truth image and a slice image;
    in a case that the each three-dimensional sample image corresponding to the initial sample image is the three-dimensional original sample image, for each initial sample image, a plurality of augmented sample images are obtained by for said each initial sample image, calculating a pixel value of a missing pixel point in the initial sample image based on a pixel value of each pixel in the initial sample image; and for said each initial sample image, filling the initial sample image according to the pixel value of the missing pixel point to obtain an augmented sample image of the plurality of augmented sample images corresponding to the initial sample image.

3. The method according to claim 2, wherein in a case that the each three-dimensional sample image corresponding to the initial sample image is the three-dimensional truth sample image, for each initial sample image, a plurality of augmented sample images are obtained by determining at least one label value corresponding to the three-dimensional truth sample image;

for each initial sample image, calculating the pixel value of the missing pixel point in the initial sample image based on the pixel value of each pixel in the initial sample image;

for each initial sample image, performing similarity clustering on the pixel value in the initial sample image which is not equal to any label value in the three-dimensional truth sample image according to a similar pixel value area in the three-dimensional original sample image corresponding thereto, so as to obtain a corrected pixel value; and for each initial sample image, filling the initial sample image according to the pixel value of the missing pixel point or the corrected pixel value to obtain an augmented sample image of the plurality of augmented sample images corresponding to the initial sample image.

4. The method according to claim 1, wherein the adding the plurality of augmented sample images into corresponding datasets based on division of image datasets to obtain an augmented three-dimensional sample image set comprises for each augmented sample image of the plurality of augmented sample images, determining whether the each three-dimensional sample image corresponding to the each augmented sample image belongs to a sample image in a training set or a sample image in a test set;

in response to a determination that the each three-dimensional sample image corresponding to the each augmented sample image belongs to the sample image in the training set, adding the each augmented sample image to the training set;

in response to a determination that the each three-dimensional sample image corresponding to the each augmented sample image belongs to the sample image in the test set, in a case that a rotation angle corresponding to the augmented sample image is greater than a predetermined rotation angle threshold, adding the each augmented sample image to the training set.

5. An apparatus for augmenting data of a three-dimensional image, comprising:

an image acquiring module, configured to acquire at least one three-dimensional sample image to be augmented;

an image rotating module, configured to rotate, for each three-dimensional sample image, the at least one three-dimensional sample image according to a predetermined rotation angle to obtain an initial sample image of a radial slice of the at least one three-dimensional sample image on a transverse section, an initial sample image of the radial slice of the at least one three-dimensional sample image on a median sagittal section and an initial sample image of the radial slice of the at least one three-dimensional sample image on a coronal section;

an image interpolation processing module, configured to perform interpolation processing on a plurality of initial sample images to obtain a plurality of augmented sample images; and a dataset dividing module, configured to add the plurality of augmented sample images into corresponding datasets based on division of image datasets to obtain an augmented three-dimensional sample image set;

in a case that the image rotating module is configured to rotate for each three-dimensional sample image of the at least one three-dimensional sample image according to a predetermined rotation angle to obtain an initial sample image of a radial slice of the each three-dimensional sample image on a transverse section, the image rotating module is configured to establish, for each said three-dimensional sample image, a three-dimensional Cartesian coordinate system based on the each three-dimensional sample image;

determine, for said each three-dimensional sample image, a first dimension of the each three-dimensional sample image in a longitudinal axis direction, and determine a first rotation angle based on the first dimension;

for said each three-dimensional sample image, with a vertical axis in the three-dimensional Cartesian coordinate system as a rotation axis, rotate the each three-dimensional sample image according to the first rotation angle to obtain a plurality of first rotating radial slice images;

collect, for said each three-dimensional sample image, longitudinal axial sectional images in each first rotating radial slice image of the plurality of first rotating radial slice images to obtain the initial sample image of the radial slice of the each three-dimensional sample image on the transverse section;

wherein the image rotating module is configured to obtain, for said each three-dimensional sample image, an initial sample image of the radial slice of the each three-dimensional sample image on a median sagittal section by for said each three-dimensional sample image, determining a second dimension of the each three-dimensional sample image in a horizontal axis direction, and determining a second rotation angle based on the second dimension;

for said each three-dimensional sample image, with the vertical axis in the three-dimensional Cartesian coordinate system as the rotation axis, rotating the each three-dimensional sample image according to the second rotation angle to obtain a plurality of second rotating radial slice images; and for said each three-dimensional sample image, collecting horizontal axial sectional images in each second rotating radial slice image of the plurality of second rotating radial slice images to obtain the initial sample image of the radial slice of the each three-dimensional sample image on the median sagittal section;

wherein the image rotating module is configured to obtain, for said each three-dimensional sample image, an initial sample image of the radial slice of the each three-dimensional sample image on a coronal section by for said each three-dimensional sample image, determining a third dimension of the each three-dimensional sample image in a vertical axis direction, and determining a third rotation angle based on the third dimension;

for said each three-dimensional sample image, with a horizontal axis or the vertical axis in the three-dimensional Cartesian coordinate system as the rotation axis, rotating the each three-dimensional sample image according to the third rotation angle to obtain a plurality of third rotating radial slice images; and for said each three-dimensional sample image, collecting horizontal axial sectional images in each third rotating radial slice image of the plurality of third rotating radial slice images to obtain the initial sample image of the radial slice of the each three-dimensional sample image on the coronal section.

6. The apparatus according to claim 5, further comprising an electronic device, said electronic device comprising a processor, a storage medium, and a bus, wherein the storage medium stores machine-readable instructions executable by the processor, wherein the processor communicates with the storage medium through the bus when the electronic device operates, and wherein the processor executes the machine-readable instructions to execute said image acquiring module, said image interpolation processing module, and said dataset dividing module.

7. A non-transitory computer-readable storage medium, wherein a computer program is stored in the non-transitory computer-readable storage medium, and the computer program, when operated by a processor, executes a method for augmenting data of a three-dimensional, said method comprising:

acquiring at least one three-dimensional sample image to be augmented;

rotating each three-dimensional sample image of said at least one three-dimensional sample image according to a predetermined rotation angle to obtain an initial sample image of a radial slice of the each three-dimensional sample image on a transverse section, an initial sample image of the radial slice of the each three-dimensional sample image on a median sagittal section and an initial sample image of the radial slice of the each three-dimensional sample image on a coronal section;

performing interpolation processing on a plurality of initial sample images to obtain a plurality of augmented sample images; and adding the plurality of augmented sample images into corresponding datasets based on division of image datasets to obtain an augmented three-dimensional sample image set;

wherein the rotating said each three-dimensional sample image according to said predetermined rotation angle to obtain said initial sample image of said radial slice of the three-dimensional sample image on said transverse section comprises for said each three-dimensional sample image, establishing a three-dimensional Cartesian coordinate system based on the each three-dimensional sample image;

for said each three-dimensional sample image, determining a first dimension of the each three-dimensional sample image in a longitudinal axis direction, and determining a first rotation angle based on the first dimension;

for said each three-dimensional sample image, with a vertical axis in the three-dimensional Cartesian coordinate system as a rotation axis, rotating the each three-dimensional sample image according to the first rotation angle to obtain a plurality of first rotating radial slice images;

for said each three-dimensional sample image, collecting longitudinal axial sectional images in each first rotating radial slice image of the plurality of first rotating radial slice images to obtain the initial sample image of the radial slice of the each three-dimensional sample image on the transverse section;

wherein for said each three-dimensional sample image, an initial sample image of the radial slice of the each three-dimensional sample image on a median sagittal section is obtained by for said each three-dimensional sample image, determining a second dimension of the each three-dimensional sample image in a horizontal axis direction, and determining a second rotation angle based on the second dimension;

for said each three-dimensional sample image, with the vertical axis in the three-dimensional Cartesian coordinate system as the rotation axis, rotating the each three-dimensional sample image according to the second rotation angle to obtain a plurality of second rotating radial slice images; and for said each three-dimensional sample image, collecting horizontal axial sectional images in each second rotating radial slice image of the plurality of second rotating radial slice images to obtain the initial sample image of the radial slice of the each three-dimensional sample image on the median sagittal section;

wherein for said each three-dimensional sample image, an initial sample image of the radial slice of the each three-dimensional sample image on a coronal section is obtained by for sad each three-dimensional sample image, determining a third dimension of the each three-dimensional sample image in a vertical axis direction, and determining a third rotation angle based on the third dimension;

for said each three-dimensional sample image, with a horizontal axis or the vertical axis in the three-dimensional Cartesian coordinate system as the rotation axis, rotating the each three-dimensional sample image according to the third rotation angle to obtain a plurality of third rotating radial slice images; and for said each three-dimensional sample image, collecting horizontal axial sectional images in each third rotating radial slice image of the plurality of third rotating radial slice images to obtain the initial sample image of the radial slice of the each three-dimensional sample image on the coronal section.

8. The apparatus according to claim 6, wherein the each three-dimensional sample image comprises a three-dimensional original sample image and a three-dimensional truth sample image;

wherein the three-dimensional truth sample image is constructed based on a corresponding relationship between a labeled two-dimensional truth image and a slice image;

in a case that the each three-dimensional sample image corresponding to the initial sample image is the three-dimensional original sample image, for each initial sample image, a plurality of augmented sample images are obtained by for said each initial sample image, calculating a pixel value of a missing pixel point in the each initial sample image based on a pixel value of each pixel in the each initial sample image; and for said each initial sample image, filling the initial sample image according to the pixel value of the missing pixel point to obtain an augmented sample image of the plurality of augmented sample images corresponding to the each initial sample image.

9. The apparatus according to claim 8, wherein in a case that the each three-dimensional sample image corresponding to the initial sample image is the three-dimensional truth sample image, for each initial sample image, a plurality of augmented sample images are obtained by determining at least one label value corresponding to the three-dimensional truth sample image;

for said each initial sample image, calculating the pixel value of the missing pixel point in the each initial sample image based on the pixel value of each pixel in the each initial sample image;

for said each initial sample image, performing similarity clustering on the pixel value in the each initial sample image which is not equal to any label value in the three-dimensional truth sample image according to a similar pixel value area in the three-dimensional original sample image corresponding thereto, so as to obtain a corrected pixel value; and for said each initial sample image, filling the initial sample image according to the pixel value of the missing pixel point or the corrected pixel value to obtain an augmented sample image of the plurality of augmented sample images corresponding to the each initial sample image.

10. The apparatus according to claim 6, wherein adding the plurality of augmented sample images into corresponding datasets based on division of image datasets to obtain an augmented three-dimensional sample image set, via said dataset dividing module, comprises for each augmented sample image, determining whether the each three-dimensional sample image corresponding to an augmented sample image of the plurality of augmented sample images belongs to a sample image in a training set or a sample image in a test set;

in response to a determination that the each three-dimensional sample image corresponding to the augmented sample image belongs to the sample image in the training set, adding the augmented sample image to the training set;

in response to a determination that the each three-dimensional sample image corresponding to the augmented sample image belongs to the sample image in the test set, in a case that a rotation angle corresponding to the augmented sample image is greater than a predetermined rotation angle threshold, adding the augmented sample image to the training set.

11. The non-transitory computer-readable storage medium according to claim 7, wherein the each three-dimensional sample image comprises a three-dimensional original sample image and a three-dimensional truth sample image;

wherein the three-dimensional truth sample image is constructed based on a corresponding relationship between a labeled two-dimensional truth image and a slice image;

in a case that the each three-dimensional sample image corresponding to the initial sample image is the three-dimensional original sample image, for each initial sample image, a plurality of augmented sample images are obtained by for each initial sample image, calculating a pixel value of a missing pixel point in the initial sample image based on a pixel value of each pixel in the initial sample image; and for each initial sample image, filling the initial sample image according to the pixel value of the missing pixel point to obtain an augmented sample image of the plurality of augmented sample images corresponding to the initial sample image.

12. The non-transitory computer-readable storage medium according to claim 11, wherein in a case that the each three-dimensional sample image corresponding to the initial sample image is the three-dimensional truth sample image, for each initial sample image, a plurality of augmented sample images are obtained by determining at least one label value corresponding to the three-dimensional truth sample image;

for each initial sample image, calculating the pixel value of the missing pixel point in the initial sample image based on the pixel value of each pixel in the initial sample image;

for each initial sample image, performing similarity clustering on the pixel value in the initial sample image which is not equal to any label value in the three-dimensional truth sample image according to a similar pixel value area in the three-dimensional original sample image corresponding thereto, so as to obtain a corrected pixel value; and for each initial sample image, filling the initial sample image according to the pixel value of the missing pixel point or the corrected pixel value to obtain the augmented sample image corresponding to the initial sample image.

13. The non-transitory computer-readable storage medium according to claim 7, wherein the adding the plurality of augmented sample images into corresponding datasets based on division of image datasets to obtain an augmented three-dimensional sample image set comprises for each augmented sample image, determining whether the each three-dimensional sample image corresponding to the augmented sample image belongs to a sample image in a training set or a sample image in a test set;

in response to a determination that the each three-dimensional sample image corresponding to an augmented sample image of the plurality of augmented sample images belongs to the sample image in the training set, adding the augmented sample image to the training set;

in response to a determination that the each three-dimensional sample image corresponding to the augmented sample image belongs to the sample image in the test set, in a case that a rotation angle corresponding to the augmented sample image is greater than a predetermined rotation angle threshold, adding the augmented sample image to the training set.

* * * * *

UNITED STATES PATENT AND TRADEMARK OFFICE
CERTIFICATE OF CORRECTION

| | |
|---|---|
| PATENT NO. | : 12,118,689 B1 |
| APPLICATION NO. | : 18/733482 |
| DATED | : October 15, 2024 |
| INVENTOR(S) | : Hui Ding et al. |

It is certified that error appears in the above-identified patent and that said Letters Patent is hereby corrected as shown below:

On the Title Page

Item [54] and In the Specification, Column 1, Lines 1-3:
Replace "THREE-DIMENSIONAL IMAGE, ELECTRONIC DEVICE AND STORAGE MEDIUM" with --METHOD AND APPARATUS FOR AUGMENTING DATA OF THREE-DIMENSIONAL IMAGE, ELECTRONIC DEVICE AND STORAGE MEDIUM--.

Signed and Sealed this
Third Day of December, 2024

Katherine Kelly Vidal
*Director of the United States Patent and Trademark Office*